United States Patent [19]

Allen et al.

[11] 4,442,719

[45] Apr. 17, 1984

[54] ACOUSTIC FLOWMETER

[76] Inventors: Ollie J. Allen, 4037 High Point Rd., Ellicott City, Md. 21043; Kelly M. Allen, 1015 Caren Dr., Sykesville, Md. 21784

[21] Appl. No.: 338,648

[22] Filed: Jan. 11, 1982

[51] Int. Cl.³ .............................................. G01F 1/66
[52] U.S. Cl. .................................................. 73/861.29
[58] Field of Search ............ 73/861.27, 861.28, 861.29

[56] References Cited

U.S. PATENT DOCUMENTS

| 2,911,826 | 11/1959 | Kritz . | |
|---|---|---|---|
| 2,959,054 | 11/1960 | Welkowitz . | |
| 3,050,997 | 8/1962 | Lake . | |
| 3,209,591 | 10/1965 | Lester et al. | 73/861.29 X |
| 3,282,101 | 11/1966 | Yamamoto . | |
| 3,290,934 | 12/1966 | Brown et al. . | |
| 3,336,801 | 8/1967 | Snavely . | |
| 3,357,243 | 12/1967 | Woodcock . | |
| 3,402,604 | 9/1968 | Kahn et al. . | |
| 3,420,102 | 1/1969 | Brown . | |
| 3,443,433 | 5/1969 | Liston et al. . | |
| 3,473,378 | 10/1969 | Yoshiyama et al. | 73/861.29 |
| 3,537,309 | 11/1970 | Geohegan, Jr. et al. | 73/861.29 |
| 3,554,030 | 1/1971 | Peronneau . | |
| 3,575,050 | 4/1971 | Lynnworth . | |
| 3,625,057 | 12/1971 | Yoshiyama et al. . | |
| 3,653,259 | 4/1972 | McShane . | |
| 3,981,191 | 9/1976 | Brown et al. . | |
| 4,011,753 | 3/1977 | Hausler . | |
| 4,011,755 | 3/1977 | Pedersen et al. | 73/861.28 |
| 4,102,186 | 7/1978 | Brown . | |
| 4,103,551 | 8/1978 | Lynnworth . | |
| 4,114,438 | 9/1978 | Muraz et al. . | |
| 4,173,889 | 11/1979 | Forster et al. . | |
| 4,183,244 | 1/1980 | Kohno et al. . | |
| 4,202,210 | 5/1980 | Multon et al. . | |
| 4,203,322 | 5/1980 | Brown et al. . | |

Primary Examiner—Charles A. Ruehl
Attorney, Agent, or Firm—Trexler, Bushnell & Wolters, Ltd.

[57] ABSTRACT

An improvement in an acoustic flowmeter of the type utilizing a pair of longitudinally spaced transceivers mounted to a fluid-carrying conduit and an oscillator feeding predetermined alternating signals to the transceivers. The improvement lies in a novel monitoring circuit which comprises a phase responsive circuit for producing signals corresponding substantially only to the phase difference between the signals produced by the respective transceivers for developing an output signal which corresponds in a predetermined fashion to the rate of fluid flow through the conduit.

21 Claims, 10 Drawing Figures

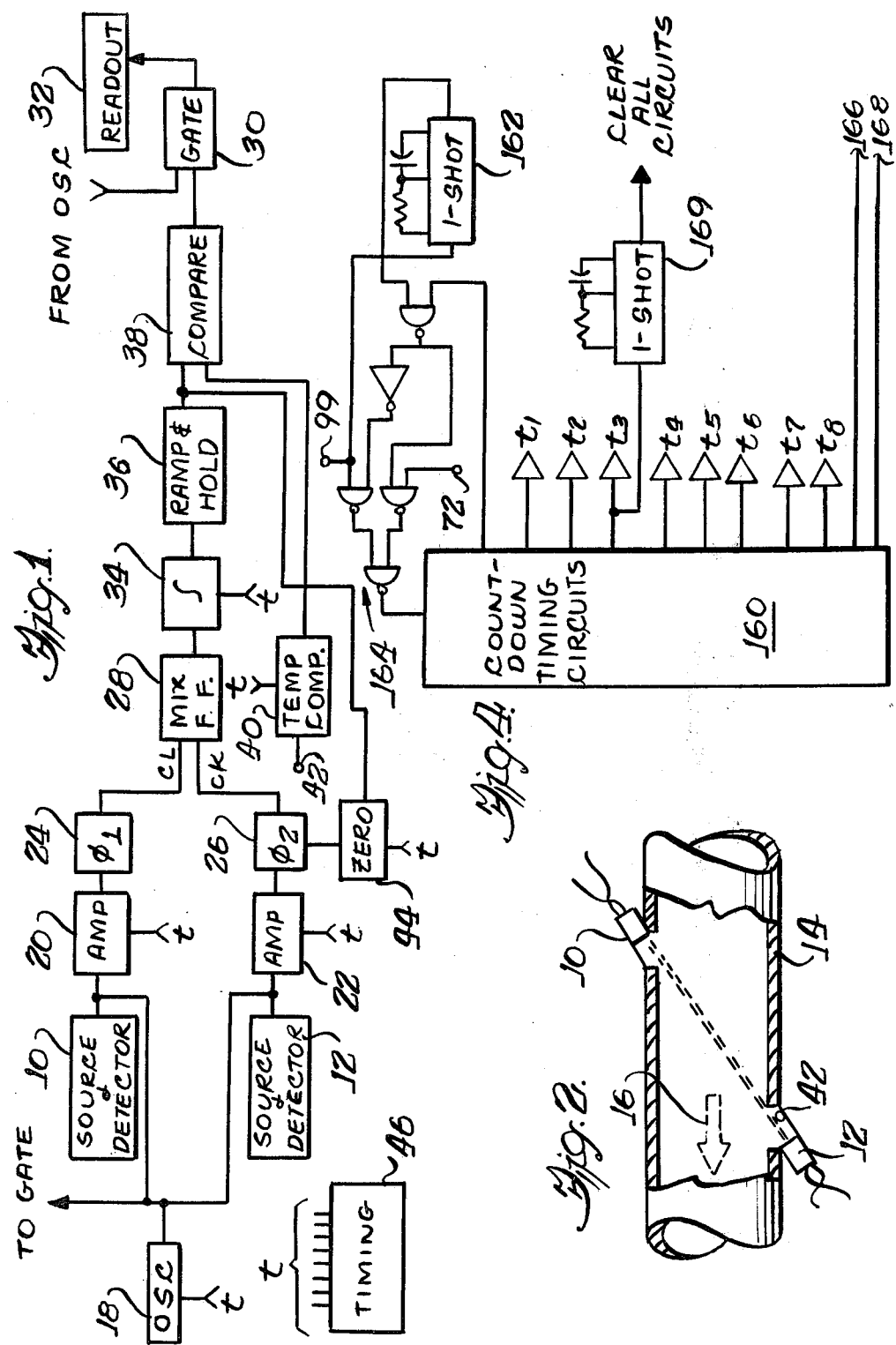

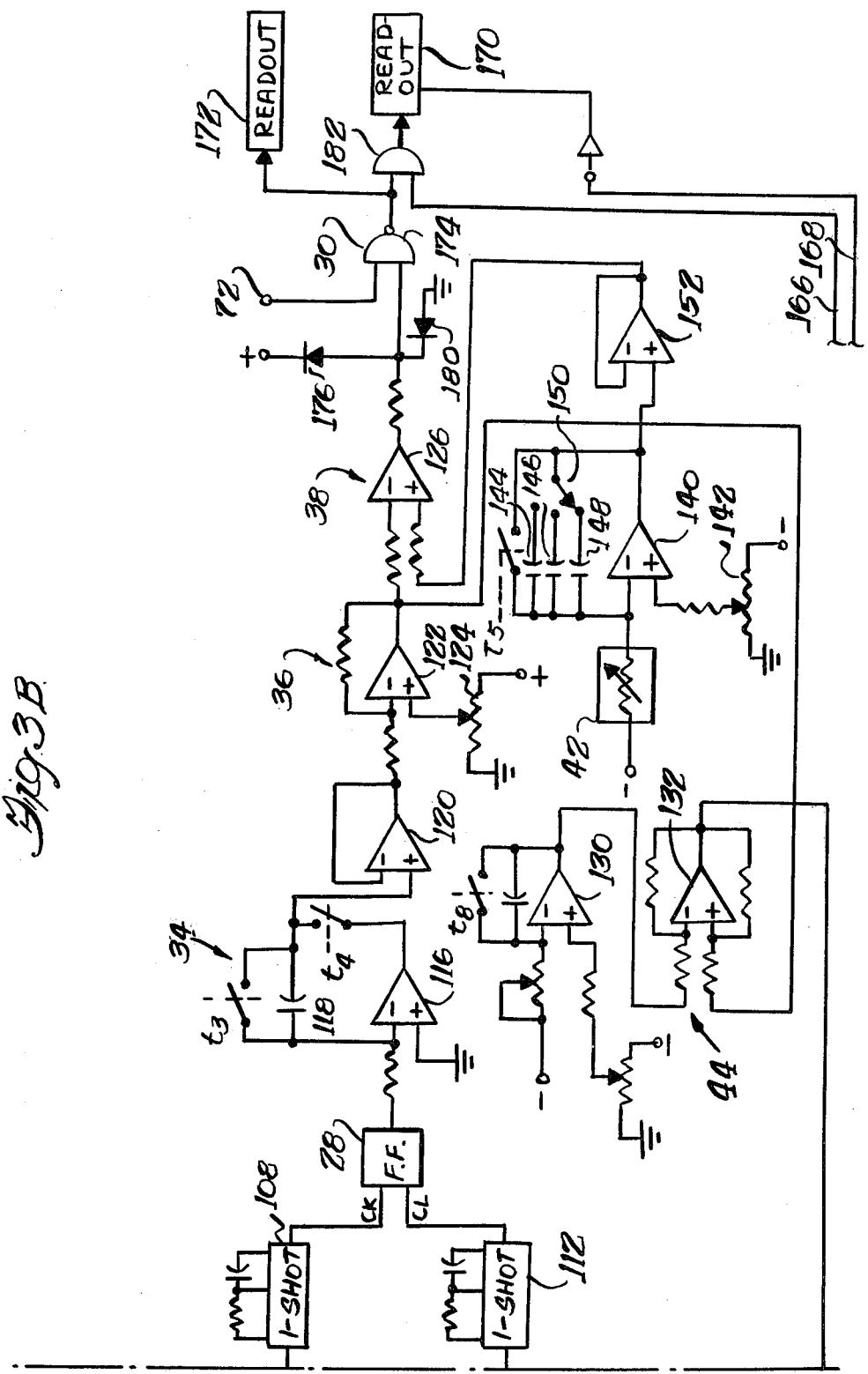

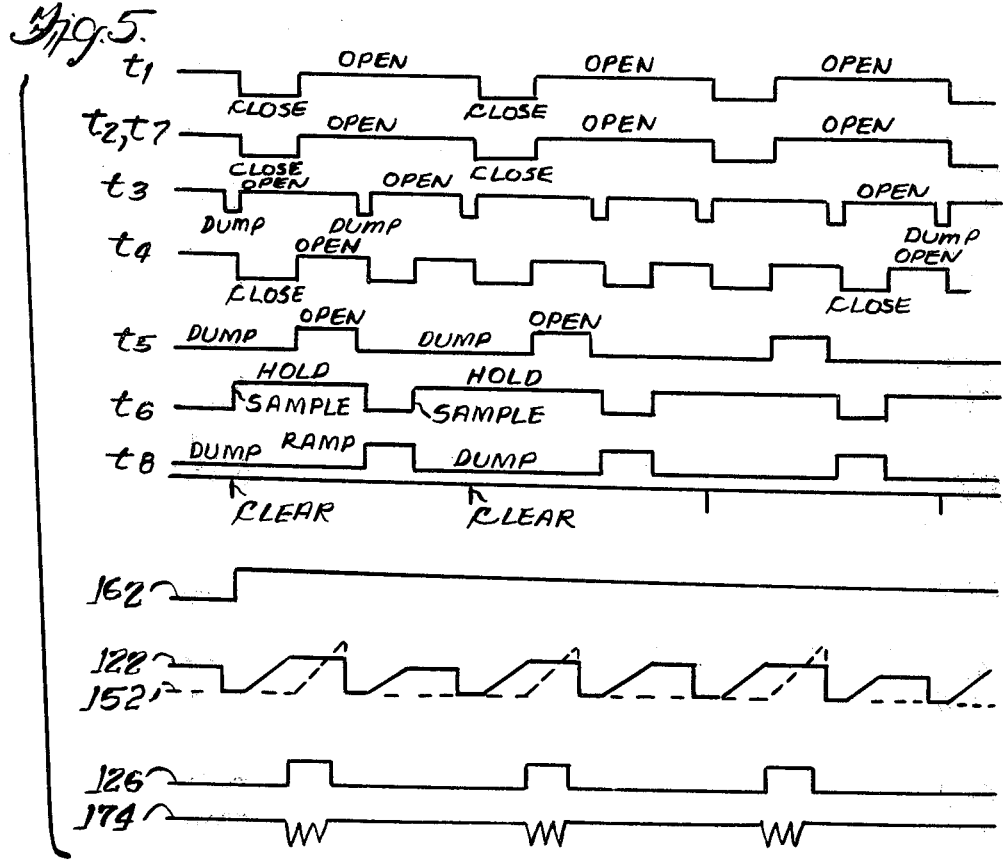
Fig. 5.
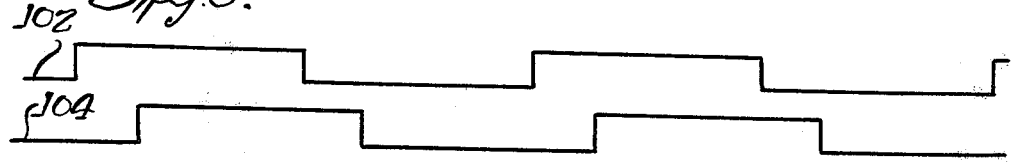
Fig. 6.
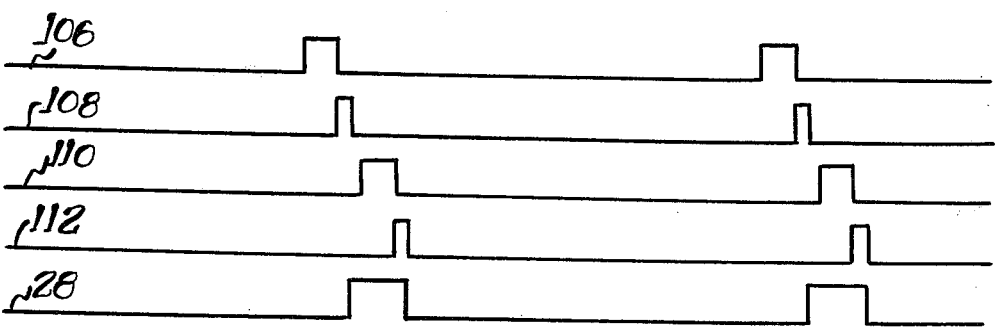

4,442,719

ACOUSTIC FLOWMETER

BACKGROUND OF THE INVENTION

The present invention is directed generally to flowmeters, and more particularly to an improvement in an acoustic flowmeter of the type which utilizes ultrasonic signals to determine the velocity of fluid flowing in a conduit.

Acoustic flowmeters of this type are generally known in the art. In accordance with conventional practice, a pair of ultrasonic transceivers are mounted to a fluid-carrying conduit at longitudinally spaced locations and facing each other diagonally across the conduit.. These transceivers or transducers are each excited at a known frequency by respective oscillators, such that the signal generated by the upstream transducer is received at the downstream transducer through the flowing fluid and vice-versa.

In accordance with practice in the prior art, a phase detector is utilized to compare the received signals and adjust the frequency of one of the oscillators such that the respective frequencies of the oscillators differ by a factor corresponding to the velocity of the fluid. The frequencies of the respective oscillators are then subjected to heterodyning, such that the algebraic sum and difference of the respective frequencies may be obtained. The algebraic sum and difference bears a known relationship to the velocity of the fluid, such that the velocity may be readily calculated therefrom. By providing a suitably calibrated meter and filter components to derive the algebraic sum and difference of the frequencies of the two oscillators, the velocity of the fluid may be displayed by the meter.

The foregoing prior art arrangement, while workable in theory, in practice has been found to suffer a serious problem of cross talk between the two channels. That is, the frequency signals generated by the respective oscillators and their associate transducers tend to become confused within the fluid medium, such that upon reception, considerable cross talk exists, making the two frequencies difficult to ascertain.

Alternative arrangements have been proposed for measuring the time of travel of a signal between respective transducers both upstream and downstream and deriving the velocity of fluid from the time difference. However, this arrangement requires extremely accurate measurement of exceedingly small time differentials and hence, accurate measurements have proven difficult to obtain. Moreover, such circuits also suffer from problems of turbulance in the conduit which tends to make the measured time differentials inaccurate.

OBJECTS AND SUMMARY OF THE INVENTION

Accordingly, it is a general object of the invention to provide an acoustic flowmeter which avoids the problems of the prior art.

A more specific object is to provide an acoustic flowmeter which is insensitive to cross talk between channels and does not require the measurement of very short time differentials.

Another object is to provide an acoustic flowmeter which is capable of accurately measuring phase angles of the transmitted and received signals from substantially 0° to substantially 360°.

A related object is to provide an acoustic flowmeter which is capable of automatically rezeroing prior to each flow measurement.

Another object is to provide an acoustic flowmeter of the foregoing type which automatically compensates for variations in fluid temperature and for the temperature/volumetric coefficient of the fluid whose flow is being measured.

Briefly, and in accordance with the foregoing objects the present invention provides an improvement in an acoustic flowmeter of the type utilizing a pair of longitudinally spaced transceivers mounted to a fluid-carrying conduit and oscillator means feeding predetermined alternating signals to the transceivers. The improvement lies in a novel monitoring circuit which comprises a phase responsive circuit for producing signals corresponding substantially only to the phase difference between the signals produced by the respective transceivers for developing an output signal which corresponds in a predetermined fashion to the rate of fluid flow through the conduit.

BRIEF DESCRIPTION OF THE DRAWINGS

The foregoing as well as other objects, features and advantages of the invention will be more readily understood upon reading the following detailed description of the illustrated embodiment, together with reference to the drawings wherein:

FIG. 1 is a functional block diagram of an improved acoustic flowmeter in accordance with the invention;

FIG. 2 is a schematic diagram illustrating the positioning of a pair of acoustic transceivers upon a conduit to measure the rate of fluid flow therethrough;

FIGS.3A and 3B, taken together, form a schematic circuit diagram of the acoustic flowmeter according to the invention;

FIG. 4 is a schematic circuit diagram of a timing circuit for controlling the sequence of operation of the circuit of FIGS. 3A and 3B;

FIG. 5 is a timing diagram illustrating one aspect of the operation of the invention;

FIGS. 6 and 7 are timing diagrams illustrating other aspects of the operation of the invention.

DETAILED DESCRIPTION OF THE ILLUSTRATED EMBODIMENT

Figure 3A:
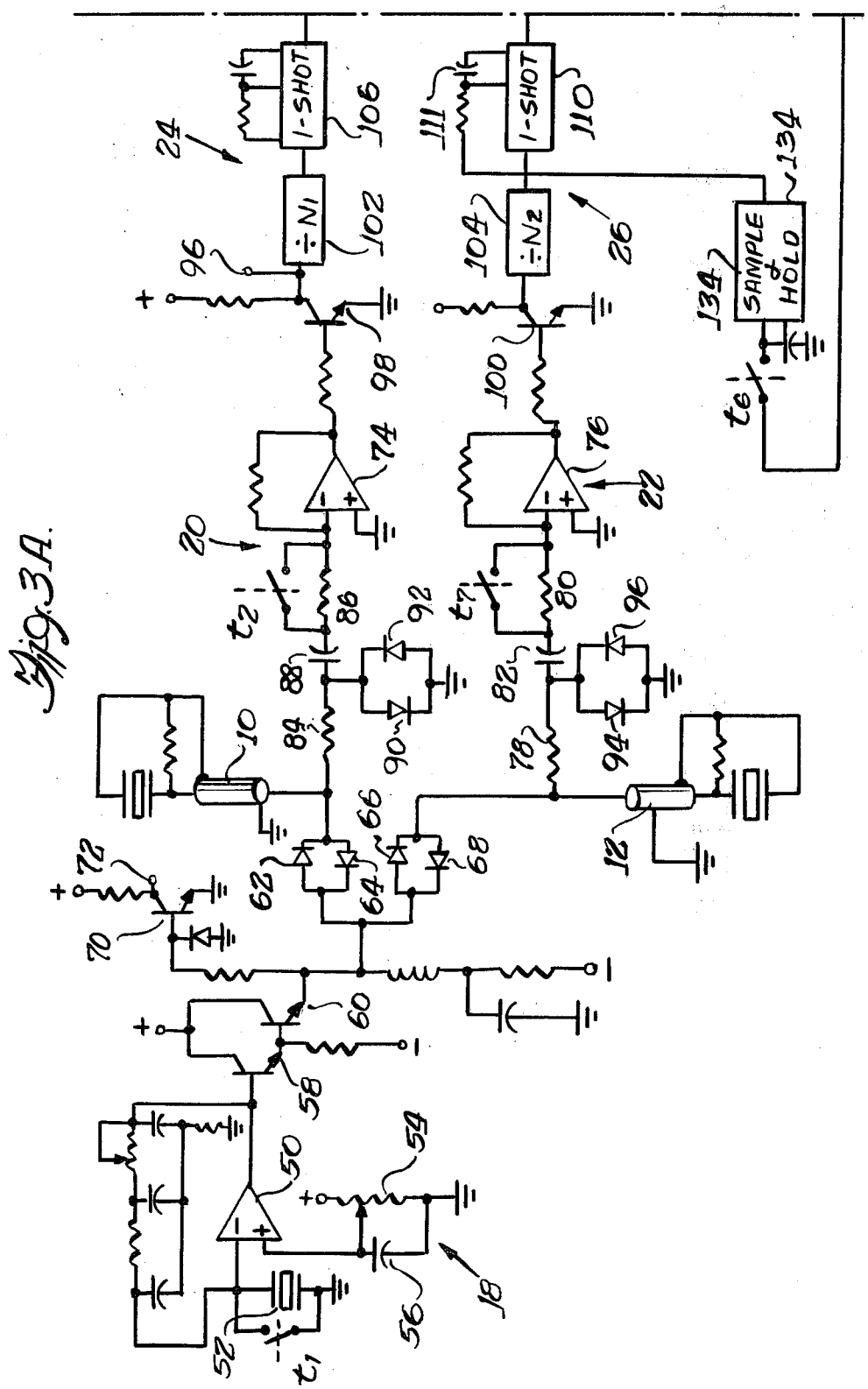

Referring now to the drawings and initially to FIG. 1, the flowmeter in accordance with the invention includes a pair of conventional ultrasonic transducers or transceivers (source and detector) 10, 12. Referring briefly to FIG. 2, it will be seen that these transceivers 10 and 12 are mounted at generally opposite sides of and at longitudinally spaced locations on a conduit 14, for measuring the velocity of fluid flow in a direction 16 therethrough. Generally speaking, the transmitter portion of the transceiver 10 transmits a signal to be received through the fluid medium by the receiver portion of the transceiver 12, and vice-versa. Accordingly, it will be appreciated that the signals are transmitted and received in generally opposing upstream and downstream directions on a diagonal across the conduit 14, due to the positioning of the transceivers 10, 12 thereon.

Returning to FIG. 1, each of these transceivers 10, 12 has a transmitter portion (not shown in FIG. 1) fed from a common oscillator 18. Hence, a predetermined alternating electric signal at a known, predetermined frequency is simultaneously fed from the oscillator 18 to the transmitter portion of each of the transceivers 10 and 12.

The receiver portions (not shown in FIG. 1) of these respective transceivers 10, 12 feed respective amplifier circuits 20, 22. These amplifier circuits 20, 22 may also select the output of the oscillator 18, as will be described later. The amplified output signals from these amplifier circuits 20 and 22 are in turn fed to respective phase responsive circuits ($\phi_1$ and $\phi_2$) 24 and 26. It will be appreciated that the phase difference between the signals received at respective transceivers 10, 12 will differ by an amount which bears a known relationship to the velocity of fluid flow in the direction 16 through the conduit 14. Hence, the phase responsive circuits 24, 26 develop fixed width output pulses which are spaced apart in time by an amount corresponding in a predetermined fashion to this phase difference. These pulses are utilized to drive a mixer or flip-flop circuit 28.

More specifically in this regard, the output pulses from the phase responsive circuit 26 are utilized to clock the flip-flop 28, while the output pulses from the phase responsive circuit 24 are utilized to clear the flip-flop 28. It will be appreciated that the pulses from the phase responsive circuit 26 which is associated with the downstream transceiver 12 are leading in phase with respect to the pulses from the pulse responsive circuit 24 which is associated with the upstream transceiver 10. Hence, the pulse width of the output of the flip-flop 28 corresponds in a predetermined fashion to the phase difference in the signals from the respective transceivers 10 and 12, and hence to the flow velocity in the direction 16 through the conduit 14. These flip-flop output pulses can theoretically be utilized directly to drive a gate circuit 30, so as to gate through a corresponding number of cycles from the oscillator 18 to a suitable readout circuit and display panel 32. However, in accordance with a preferred form of the invention the necessity of reading and measuring these relatively small time intervals is obviated by the inclusion of further circuitry intermediate the flip-flop 28 and gate 30.

In this latter regard, an integrator circuit 34 and a ramp and hold circuit 36 are interposed in series from the output of the flip-flop 28. Hence, the output pulses from the flip-flop 28 are integrated and utilized to drive the ramp and hold circuit 36 at a corresponding ramp rate to a corresponding DC or "hold" level Consequently, both the ramp rate and the DC or hold level of the ramp and hold circuit 36 correspond to a time integral of the pulses produced by the flip-flop 28. The output of this ramp and hold circuit 36 is fed to one input of a comparator 38 whose output feeds the gate 30 previously mentioned. The other input of this comparator 38 may be fed from a second reference ramp signal which ramps at a predetermined or nominal reference rate, thereby causing the comparator 38 to output a gating signal to the gate 30 which is of a time duration corresponding to the time integral of the pulses from the mixer flip-flop 28 referenced against this fixed ramp level. However, in accordance with another feature of the invention, this latter reference ramp signal is produced by a temperature compensation circuit 40.

Referring again briefly to FIG. 2, a temperature sensor and preferably a thermistor 42 is placed in contact with the fluid in conduit 14, preferably by mounting it adjacent one of the transceivers 10, 12. In the illustrated embodiment the thermistor 42 is mounted adjacent the transceiver 12. Referring again to FIG. 1, this temperature sensor or thermistor 42 feeds a signal to the temperature compensation circuit 40 corresponding to the temperature of the fluid in the conduit 14. This temperature compensation circuit 40 produces a ramp signal at a rate which corresponds in a predetermined fashion to the temperature of the fluid measured by the thermistor 42. Accordingly, as the temperature of the fluid in the conduit 14 varies upwardly and downwardly from some fixed reference temperature, and preferably 68° F., the ramp rate of the signal produced by temperature compensation circuit 40 varies from its nominal value accordingly. Responsively, the comparator circuit 38 further varies the gating signal fed out to the gate 30 in accordance with the temperature compensation ramp and hence with variations in the temperature of the fluid from the reference temperature. This effectively compensates the measured flow reading for variations in the temperature of the fluid from the reference temperature. It will be appreciated that such variations in temperature directly affect the flow rate and hence accuracy of the readout 32 is thereby assured.

In accordance with a preferred form of the invention, the temperature compensation circuit 40 is also provided with suitable circuits (not shown in FIG. 1) for further varying its output in accordance with the temperature/volumetric coefficient of the particular fluid flowing through the conduit 14. Hence, the comparator circuit 38, gate circuit 30 and readout 32 are further compensated for the temperature/volumetric coefficient of the particular fluid whose flow is being measured in the conduit 14.

In accordance with yet a further preferred form of the invention, an automatic zeroing circuit 44 is also provided. This zeroing circuit 44 receives the output of the ramp and hold circuit 36 and feeds a zeroing signal to the phase responsive circuit 26 associated with the downstream transceiver 12. In this regard, suitable timing signals (t) are fed to the oscillator 18, to the amplifier circuits 20, 22 and to the zeroing circuit 44 for carrying out this zeroing or zero correction process upon the circuit of FIG. 1.

In accordance with a preferred form of the invention, measurements are carried out in a cyclical fashion, with a zeroing or zero correction interval intermediate each measurement. Accordingly, when the zero correction circuit 44 is activated, the signal from the oscillator 18 is simultaneously selected by both of the amplifier circuits 20 and 22. The mixer flip-flop 28 should then in theory produce no output signal. However, in order to prevent the circuits from operating from a zero phase-zero time reference, the phase responsive networks or circuits 24 and 26 offset the zero flow responsive output of the mixer flip-flop 28 somewhat as will be seen later. The output of the ramp and hold circuit 36 is at the same time compared with a reference so as to further vary the offset by any amount necessary to accomplish correction for slight phase errors in the circuitry up to and including the ramp and hold circuit 36.

A suitable timing circuit 46 provides the timing control signals (t) to the foregoing circuit components and also to the temperature compensation circuit 40 and integrating circuit 34 in order to control the sequence of operation of the flowmeter of FIG. 1.

Reference is now invited to FIGS. 3A and 3B wherein the flowmeter of FIG. 1 is illustrated in circuit schematic form. The oscillator circuit 18 comprises a conventional oscillator circuit utilizing an operational amplifier 50. In accordance with a preferred form of the invention, however, a crystal 52 is added for stability and a potentiometer 54 and capacitor 56 form an RC network for tuning the oscillator 18 to the frequency of the crystal 52. A controlled switching means t1 is responsive to a control signal from the timing circuit 46 for turning the oscillator circuit 18 on and off. The operation of the oscillator 50 is thus improved in the speed of turn-on and turn-off by using a crystal 52 in conjunction with a self-excited oscillator circuit.

The oscillator circuit 18 feeds the two source and detector members or transceivers 10, 12 by way of a suitable network including a current amplifier comprising a pair of emitter follower transistors 58 and 60 and a pair of static gates comprising back-to-back pairs of diodes 62, 64 and 66, 68. The static gate comprising diodes 62 and 64 feeds both the transceiver 10 and an input to the amplifier circuit 20. Similarly, the static gate comprising diodes 66 and 68 feeds both the transceiver 12 and an input to the amplifier circuit 22.

The emitter follower circuit amplifier also feeds a TTL converter comprising a transistor 70, so that a TTL-compatible signal at the collector electrode 72 thereof may be utilized elsewhere in the circuit as will be described hereinbelow.

When the oscillator is gated off, the DC voltage at the output of the emitter follower 60 is substantially zero. Hence, the returning received signals from the transceivers 10 and 12 are not loaded by the transmitters because their voltage amplitude is insufficient to break down the diodes 62, 64 and 66, 68 comprising the static gates.

The amplifier circuits 20 and 22 each comprise an operational amplifier 74, 76. The signal transmitted downstream by the transceiver 10 is received by the transceiver 12 and fed to the op amp 76 by way of a series-connected circuit including resistors 78, 80 and capacitor 82. Similarly, the signal transmitted upstream by transceiver 12 and received by transceiver 10 is fed to the op amp 74 by way of series-connected circuit comprising resistors 84 and 86 and capacitor 88.

During the period of time when the oscillator circuit 18 is switched on and the transceivers 10 and 12 are transmitting, the resistors 78 and 84 prevent loading of the transceivers 10, 12 due to the provision of back-to-back swamping diodes 90, 92 and 94, 96, respectively. These diodes also prevent an excessive voltage from reaching the operational amplifiers 74 and 76 at this time, without loading down the received signals, since the voltage level of the received signals is insufficient to break down these diodes.

Additional controlled switches t2 and t7 are in parallel with the respective resistors 86 and 80 at the inputs of the respective op amps 74 and 76. These switches t2 and t7 are open during the time period when the transmission is occurring between the respective transceivers 10 and 12 to reduce the gain of the amplifier circuits 20 and 22 and closed during reception, so that the outputs of these amplifier circuits 20, 22 are essentially at the same level during both transmission and reception by the transceivers 10, 12. As will be seen later, this also enables zeroing of the flowmeter during the transmitting period.

The signals from the respective amplifier circuits 20 and 22 are converted to TTL voltage levels by respective transistors 98 and 100 which feed the converted TTL level signals to the respective phase responsive circuits 24 and 26.

Referring also to FIG. 3B, these two phase responsive circuits 24 and 26 are substantially similar, and each includes a ÷ N circuit 102, 104 and a pair of one-shot circuits 106, 108 and 110, 112. The output of the one-shot 108 feeds the clock input (CK) of the mixer flip-flop 28, which comprises a conventional flip-flop circuit. The output of the one-shot 112 feeds the clear input (CL) of the flip-flop 28, so as to produce an output pulse whose width bears a predetermined relationship with the phase difference of the upstream and downstream received signals as described above.

Advantageously, these phase responsive circuits 24, 26 and the flip-flop 28 need not operate from a zero time at a zero phase difference, since the two divider circuits 102 and 104 are provided with different divisors. Hence, a predetermined phase shift is provided even in the presence of zero flow. Hence, the provision of the different divisors for the divider circuits 102 and 104 permits an overall phase shift between the respective phase responsive circuits 24 and 26 of from substantially 0° to substantially 360° with an optimum time differential into the flip-flop 28. In the illustrated embodiment, therefore, the pulse width of the output of the flip-flop 28 varies linearly with the fluid flow rate.

The output of the flip-flop 28 feeds the input of the integrating circuit 34 which in the illustrated embodiment comprises a ramp and hold circuit including an operational amplifier 116 which is provided with a capacitor 118 wired between the input and output thereof to achieve integration of the pulses from the flip-flop 28. A timing switch t3 is provided across the capacitor 118 and another timing switch t4 is provided in series between the output of the op amp 116 and the capacitor 118. During the time period when signals are being received by the respective transceivers 10 and 12 the switch t3 is open and the switch t4 is closed, whereby the op amp 116 provides an integrated ramp signal output. At the end of this reception time period the switch t4 opens holding the resulting DC charge on the capacitor 118 at the end of the ramp. The junction of the capacitor 118 and switch t4 feeds the input of a buffer stage comprising a further operational amplifier 120 whose output feeds the ramp and hold circuit 36.

In the illustrated embodiment, this ramp and hold circuit 36 comprises a further operational amplifier 122 which receives the buffered output of the integrating circuit 34 at its inverting input and a reference voltage provided from a suitable potentiometer 124 at its non-inverting input. The frequency response of this latter op amp 122 is such that it substantially filters out any remaining base oscillator frequency of the oscillator 50 carried in the buffered integrator output and outputs a smooth ramp signal or a DC "hold" signal level into the inverting input of the comparator 38. In the illustrated embodiment this comparator 38 comprises an op amp 126. The output of the ramp and hold circuit 36 which comprises the output of op amp 122 also provides a feedback signal to the automatic zeroing circuit 44 as previously mentioned.

In the illustrated embodiment this automatic zeroing circuit comprises a pair of operational amplifiers 130, 132 wired as comparators and a sample and hold circuit 134 (FIG. 3A). The first op amp comparator 130 is used to provide a switchable reference signal and to this end is provided with a timing control switch t8. This switched reference signal is fed to the inverting input of the op amp 132 while the non-inverting input thereof receives the signal fed back from the output of the ramp and hold op amp 122. The output of the op amp 132 feeds the input of the sample and hold circuits 134 through a further timing control switch t6. The output of the sample and hold circuit 134 feeds a pulse width control RC network 111 coupled with the one-shot 110 (FIG. 3A).

The temperature compensation circuit 40 feeds the noninverting input of the op amp 126 which comprises the comparator 38. This temperature compensation network comprises an operational amplifier 140 which receives the output of the thermistor 42 at its inverting input and a reference voltage at its non-inverting input by way of a suitable potentiometer 142. A further timing control switch t5 is wired between the non-inverting input and output of the op amp 140. In order to compensate for the temperature/volumetric coefficient of the fluid flowing in the conduit 14, a variable capacitance network is also provided between the inverting input and the output of the op amp 140. In the illustrated embodiment, this variable capacitance network takes the form of three capacitors 144, 146 and 148 of different, preselected values, each of which has one terminal tied to the inverting input of the op amp 140. A suitable three-position switch 150 is then provided for selecting the opposite terminal of one of these three capacitors 144, 146 or 148 at the output of the op amp 140. A suitable buffer comprising a further operational amplifier 152 is provided intermediate the output of the op amp 140 and the non-inverting input of the comparator 126.

Reference is next invited to FIG. 4, wherein the timing circuit for operating the switches t1 through t8 in accordance with a predetermined measurement cycle or sequence is illustrated. This timing control circuit comprises a conventional divider/counter circuit 160 having the requisite number of outputs for operating the timing control switches t1 through t8 inclusive, as well as providing timing control signals to other circuit points as will be presently described.

The input to the timing counter/divider circuits 160 is provided from a one-shot 162 by way of a suitable logic network designated generally by the reference numeral 164. The one-shot 162 is triggered from the TTL converter 98 at circuit point 99. This logic network also receives control inputs from the circuit point 99 and from the output of the TTL oscillator converter at the circuit point 72. The switches t1 through t8 inclusive are electronic switches energized from the respective like-designated outputs of the divider/counter circuit 160. Additionally, a clear signal for clearing all circuits at the appropriate time is provided from the t3 output by way of a one-shot 169. Two remaining outputs 166, 168 of the divider/counter circuit 160 feed the like-designated lines in the circuit of FIG. 3B for controlling a gallon per minute readout 170. In this regard, a cumulative gallons readout 172 is also provided.

Both of these readouts 170 and 172 are energized from the gate circuit 30, which in the illustrated embodiment comprises a conventional two-input NAND gate 174. One of the two inputs of the NAND gate 174 is fed from the output of the comparator 126 while the other input receives the oscillator signal from the TTL converter 70 at the circuit point 72. Additionally, the DC level of the input to the gate 30 from the comparator 126 is controlled by a pair of diodes 176 and 180 coupled from a suitable positive supply and ground and having their midpoint coupled to the gate 30. The output of the gate 30 directly feeds the gallons readout 172 while the necessary timing to achieve a gallons per minute signal to the gallons per minute readout 170 is achieved by a further two-input NAND gate 182. In this regard, one input of the NAND gate 182 is fed from the output of the NAND gate 174 while the other input thereof is fed from the timing line 166 of the divider/counter circuit 160. The remaining timing control line 168 feeds the readout 170 directly.

The cycle or sequence of operation of the three circuits of FIGS. 3A and 3B as controlled by the timing circuit 160 of FIG. 4 will be best understood upon reference to the timing chart of FIG. 5.

Referring now to FIG. 5, the relative timing provided by the outputs of the timing circuit 160 are indicated by waveforms indicated by like-designated reference numerals t1 through t8, inclusive, and "clear". Additionally, the relative timing of the output of the one-shot 162 for initiating the timing cycle of the timer circuit 160 is illustrated. Also, the relative timing of typical output signals of the operational amplifier 122, the buffer 152, the operational amplifier 126 and the gate 174 is indicated. The operation of the respective pulse responsive circuits 24, 26 and the mixer flip-flop 28 in response to substantially zero flow condition and in response to a substantially full flow condition in the conduit 14 will be better understood upon reference to FIG. 6 and FIG. 7. In FIG. 6, typical received output signals of the respective transceivers 10, 12 at the outputs of the respective associated divider circuits 102 and 104 in response to substantially a zero flow condition in the conduit 14 are indicated. Therebelow the responsive outputs of the respective one-shot circuits 106, 108 and 110, 112 and the output of the flip-flop 28 in response thereto is indicated. Briefly, it will be seen that the flip-flop 28 is clocked by the falling edge of the output pulse from the one-shot 108 and cleared by the falling edge of the output pulse from the flip-flop 112. It will also be noted that the offset provided by the choice of the divisors of the divider circuits 102 and 104 result in a pulse width greater than zero being output by the flip-flop 28 in response to the zero flow condition.

Figure 7:
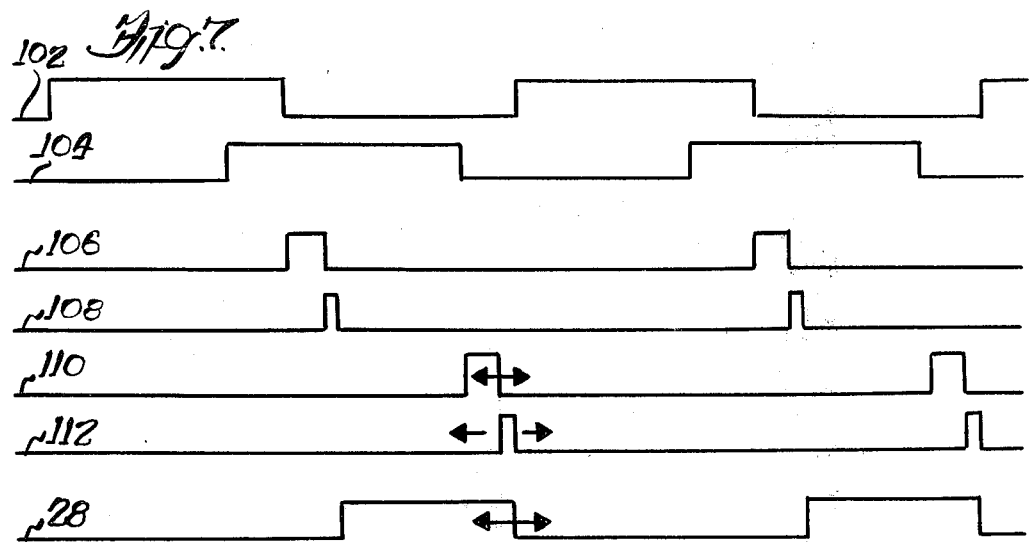

Referring briefly to FIG. 7, the outputs of the same components as in FIG. 6 are illustrated in response to a substantially full flow or 360° phase shift. It will be noted that the pulse width of the output of the flip-flop 28 is substantially longer for this maximum flow condition. During the operation of the automatic zeroing circuit 44, in accordance with the sequence of closure of the switches t1 through t8 as discussed above, the pulse width of the one-shot 110 may be modified in either direction as indicated by the arrows, in response to the zero correction signal developed at the sample and hold circuit 134 of FIG. 3A. Since the following one-shot 112, which is a fixed pulse width, is not triggered until the falling edge of the output of the one-shot 110 occurs, this pulse may also be shifted a corresponding amount as indicated by additional arrows. Consequently, it will be recognized that the falling edge and hence pulse width of the pulse produced by the flip-flop 28 may be shifted a corresponding amount as also indicated by arrows.

When the timing circuit 46 reaches the predetermined time in the cycle or sequence of operation for automatic zeroing, the switches t2 and t7 will be opened and the sample and hold circuit will be placed in the sample mode by the operation of the switch t6. At the same time, the switch t8 will be opened to allow the ramp circuit including the op amp 130 and the comparator including op amp 132 to accomplish the automatic zeroing correction and feed the corresponding correction signal to the sample and hold circuit 134. Since the transceivers 10 and 12 are transmitting rather than receiving during this period, essentially the same signal (no phase difference) will be fed to both amplifiers 20, 22 and associated pulse responsive networks 24 and 26. Hence, the output of the mixer flip-flop 28 will be essentially that expected for a zero flow condition through the conduit 14, during which there would be no phase-shift experienced between the signals received by the respective transceivers 10 and 12. Hence, automatic zeroing may be readily accomplished intermediate successive measurements of the received signals at the transceivers 10 and 12 without interrupting the flow through the conduit 14.

Figure 8:
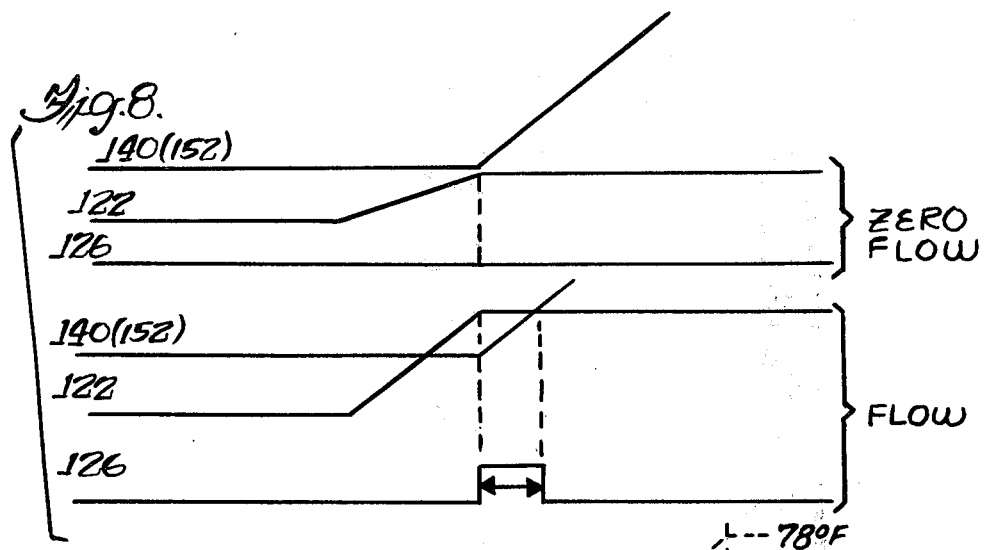
FIGS. 8 and 9 are diagrams of electrical signals illustrating still further aspects of the operation of the invention.
Figure 9:
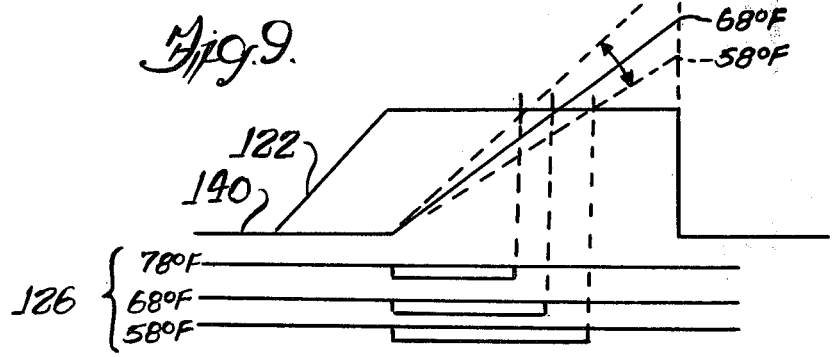

Referring to FIG. 8 and FIG. 9, the operation of the ramp and hold circuit 36 with respect to temperature and temperature/volumetric coefficient compensation as well as the responsive output of the comparator 38 and gate 30 are illustrated.

Referring first to the top half of FIG. 8, the outputs of the ramp and hold circuit 122 (comprising the output of ramp and hold 36) and of the temperature compensation ramp 140 (by way of buffer 152) for substantially zero flow condition, or alternatively, during the zeroing procedure as described above, are illustrated. It will be seen that the DC level of the temperature compensation ramp 140 never reaches the DC level of the ramp and hold circuit 122 for zero flow condition. In this condition it will be noted that the output of comparator 126 remains flat and hence the gate 30 (NAND gate 174) will not admit any pulses from the oscillator to either of the readouts 172 or 170.

The bottom half of FIG. 8 shows the signal conditions on the same components in response to a non-zero flow condition. Here, it will be noted that the comparator 126 (38) goes from the flat or logic 0 condition to the logic 1 condition upon the departure from ambient DC level of the temperature compensation ramp and hold 140 (by way of buffer 162). When the level of the ramp signal from the temperature compensation ramp circuit 140 reaches the DC level of the DC hold level at the end of the ramp period of the ramp and hold circuit 36 (122), the comparator output again goes to the low state. Hence, this comparator 126 (38) provides a gating signal to the gate 30 in accordance with the conditions in the two ramp circuits 122 and 140.

It will be remembered that the ramp rate and hence the ultimate DC hold level (due to the timing described above) of the ramp and hold circuit 122 correspond to the fluid flow through the conduit 114. The period of time that the level of the ramp 122 is greater than the level of the ramp 122 defines the time duration of the gating signal 126, which begins at the start of the ramp 140. Hence, the time duration of the gating signal from the comparator 126 is also linearly related in this fashion. It will be further appreciated that the foregoing signals result from the phase difference-responsive pulse width of the output of the flip-flop 28 integrated over a time to remove the relatively rapid frequency thereof which corresponds substantially to the frequency of the oscillator. Hence, the readout circuit need not respond to the extremely small time differentials corresponding to the pulse widths of the output pulses from the flip-flop 28.

Referring now to FIG. 9, the effect of the temperature compensating circuit 40 will be more readily understood. Briefly, the same output signals as in FIG. 8 are illustrated, together with the changing ramp rate of the output of the ramp circuit 140 in response to temperatures of 58° F. and 78° F., respectively, in dashed line. In this regard, the illustration of FIG. 8 assumed a standard reference temperature of 68° F., which is again illustrated in solid line in FIG. 9. The responsive gate signal output of the comparator circuit 126 (38) at each temperature (58°, 68° and 78°) is shown in FIG. 9. It will be noted that the width of this gating signal varies inversely and linearly in accordance with the temperature. It should be further noted that the ramp rate and hence pulse width at the output of comparator 126 will be similar varied by the selection of a temperature/volumetric coefficient for a particular fluid at the switch 150.

While the invention has been illustrated and described above with reference to a preferred embodiment, the invention is not limited thereto. Those skilled in the art may devise various alternatives, changes and modifications upon reading the foregoing descriptions. The invention includes such alternatives, changes and modifications insofar as they fall within the spirit and scope of the appended claims.

The invention is claimed as follows:

1. An improvement in a monitoring circuit for an acoustic flowmeter of the type including a pair of ultrasonic transceivers at facing, longitudinally spaced locations along a conduit for producing alternating electrical output signals, each in response to the other, said electrical signals differing in phase by an amount corresponding to the rate of fluid flow in said conduit, oscillator means for feeding a predetermined alternating electrical input signal to said transceivers, said monitoring circuit being coupled to said transceivers for receiving the output signals produced thereby and for producing responsive output signals which correspond to the rate of fluid flow, the improvement comprising: a pair of phase responsive circuit means responsive respectively to the two transceivers output signals for producing pairs of pulse signals having a phase difference therebetween which corresponds in a predetermined fashion to the phase difference between said output signals from the respective transceivers, both of said phase responsive circuit means including phase shifting means for producing a pair of phase-shifted pulse signals having a predetermined minimum phase difference therebetween, even in response to a zero phase difference between the transceiver output signals, comparing means responsive to said pairs of pulse signals for producing a gating signal having a duration which corresponds to the difference in phase between said pairs of pulse signals and gating means coupled to said oscillator means and responsive to said gating signal for gating through a portion of said predetermined alternating signal corresponding in a predetermined fashion to the rate of fluid flow through said conduit means.

2. The improvement according to claim 1 and further including zeroing circuit means selectable at predetermined times for substituting said oscillator signal for said transceiver output signals at both of said phase responsive circuit means and producing a zeroing reference signal corresponding to the phase difference between the pairs of pulse signals produced in response to said oscillator signals, said phase shifting means being further responsive at times other than said predetermined times to said zeroing signal thus established for modifying said predetermined miniumum phase difference between said pairs of pulse signals in accordance therewith, thereby modifying said gating signal by a corresponding amount so as to reference said gating signal against a signal representing zero flow.

3. The improvement according to claim 2 and further including temperature sensor means mounted to said conduit for producing a temperature signal corresponding to the temperature of the fluid flowing through said conduit and temperature compensation circuit means coupled with said comparing means and responsive to said temperature signal for modifying said gating signal in a predetermined fashion to compensate for the difference in the temperature of said fluid from a predetermined reference temperature.

4. The improvement according to claim 3, wherein said temperature compensation circuit means further includes adjustable means for varying said temperature signal in accordance with the temperature/volumetric coefficient of each of a plurality of predetermined fluids, so as to further modify said gating signal compensate for the temperature/volumetric coefficient of the one of said predetermined plurality of fluids flowing in said conduit means.

5. The improvement according to claim 3 wherein said phase responsive means comprises a first multivibrator responsive to an upstream one of said transceivers for producing first pulse signals and a second multivibrator responsive to a downstream one of said transceivers for producing second pulse signals and wherein said comparing means includes flip-flop means arranged to be clocked by the pulse signals from the second multivibrator and cleared by the pulse signals from the first multivibrator, whereby said flip-flop produces output pulses whose width corresponds in a predetermined fashion to the phase difference between said pulse signals from said first and second multivibrators, respectively.

6. The improvement according to claim 5 wherein said comparing means further includes integrating ramp and hold circuit means interposed between said flip-flop means and said gating means and responsive to said flip-flop means for producing a ramp signal at a ramp rate which corresponds to the output signals produced by said flip-flop integrated over a predetermined time and wherein said temperature compensation circuit means comprises a second ramp and hold circuit responsive to said temperature sensor means for producing a second ramp signal at a rate which varies with said temperature signal and wherein said comparing means further includes comparator circuit means for receiving the respective ramp signals from said first and second ramp and hold circuits and producing said gating signal in response thereto.

7. The improvement according to claim 6 wherein said zeroing circuit means comprises switching means activated at said predetermined times for feeding said oscillator signal to said phase responsive means and second comparator circuit means responsive to the output of said first ramp and hold circuit means and a predetermined reference signal for producing said zeroing signal, and means for activating said second comparator circuit means at said predetermined times for producing said zeroing signal and sample and hold circuit means for holding said zeroing signal for application to said phase responsive circuit means.

8. The improvement according to claim 7 and further including timing means for actuating said switching means and said activating means at said predetermined times for producing zeroing signals immediately prior to flow measurements occurring intermediate said predetermined times.

9. The improvement according to claim 3 and further including timing means coupled to said oscillator means, to said phase responsive means, to said zeroing means and to said temperature correction means for establishing a predetemined time sequence of operation thereof.

10. The improvement according to claim 1 wherein said oscillator means comprises a gated, crystal-controlled oscillator.

11. An improved monitoring circuit for an acoustic flowmeter of the type including a pair of ultrasonic transceivers at opposing, longitudinally spaced locations along a conduit and each producing an alternating electrical received signal, the two received signals differing in phase by an amount corresponding to the rate of fluid flow in said conduit and oscillator means for feeding a predetermined alternating electrical signal to be transmitted by each of said transceivers, said monitoring circuit comprising: phase responsive means responsive to the received signals for producing corresponding pulse signals having a phase difference therebetween which corresponds in a predetermined fashion to the difference in phase between said received signals, comparing means responsive to said pulse signals for producing a corresponding gating signal having a pulse width which corresponds to the phase difference between said pulse signals, gating means coupled to said oscillator means and responsive to said gating signal for gating through a portion of the alternating signal from the oscillator which corresponds to the rate of fluid flow through said conduit means, and wherein said comparing means further includes integrating circuit means for producing a gating signal which corresponds in a predetermined fashion to the integral of phase difference between a plurality of said pulse signals over a predetermined time interval.

12. The improvement according to claim 11 wherein said integrating means comprises a first integrating ramp and hold circuit for producing a ramp signal which proceeds at a ramp rate which corresponds to said time integral of said pulse signals and wherein said comparing means further includes a second ramp and hold circuit which produces a ramp signal at a nominal rate, but trailing in time the ramp from said first integrating ramp and hold circuit, and a comparator circuit coupled to receive the respective signals from said first and second ramp and hold circuits, for comparing the signals and for producing said gating signal to said gating means in accordance with said comparison.

13. The improvement according to claim 12 and further including temperature sensing means mounted to said conduit for producing a signal corresponding to the temperature of the fluid therein and coupled to said second ramp and hold circuit for varying the ramp rate thereof from said nominal rate in accordance with said fluid temperature.

14. The improvement according to claim 13 wherein said second ramp and hold circuit further includes means responsive to said temperature signal for varying the ramp rate thereof from said nominal rate in accordance with the variation in the temperature of the fluid from a predetermined reference temperature.

15. The improvement according to claim 14 wherein said reference temperature is substantially 68° F.

16. The improvement according to claim 13 and further including temperature/volumetric coefficient compensating means coupled to said second ramp and hold means for further varying the ramp rate thereof in accordance with a factor corresponding to the temperature/volumetric coefficient of one of a plurality of predetermined fluids and means for selecting said factor in accordance with which of said plurality of predetermined fluids is present in the conduit.

17. The improvement according to claim 12 and further including automatic zeroing circuit means coupled to receive the ramp and hold signal from said first ramp and hold circuit means and responsive thereto for producing a zeroing correction signal at first predetermined times and coupled to said phase responsive means for varying the phase of the pulse signals produced thereby corresponding to one of the two received signals at second predetermined times in accordance with said zeroing correction signal.

18. The improvement according to claim 17 wherein said automatic zeroing circuit means further includes means operative at said first predetermined times for substituting said oscillator signal for said received signals at said phase responsive means, said zeroing correction signal thereby corresponding to the ramp and hold signal produced in response to said application of said oscillator signals to said phase responsive means.

19. The improvement according to claim 18 wherein said phase responsive means comprises a pair of phase responsive circuits, each producing pulse signals in response to said received signals and phase shifting means coupled to at least one of said phase responsive circuits for shifting the phase of the pulses produced thereby a predetermined minimum amount, thereby producing a predetermined minimum phase difference between said pulse signals in response to a zero phase difference between the received signals, said phase shifting means further being responsive to said zeroing correction signal for modifying the amount of phase shift produced thereby in accordance with said zeroing correction signal.

20. A monitoring circuit for an acoustic flowmeter of the type including a pair of ultrasonic transceivers at facing, longitudinally spaced locations along a conduit for producing alternating electrical output signals one in response to the other, said electrical signals differing in phase by an amount corresponding to the rate of fluid flow in said conduit, oscillator means for feeding a predetermined alternating electrical input signal to said transceivers, said monitoring circuit being coupled to said transceivers for receiving the output signals produced thereby and for producing responsive output signals which correspond to the rate of fluid flow; said monitoring circuit comprising: phase responsive means for producing pairs of pulse signals having a phase relationship therebetween which corresponds in a predetermined fashion to the phase relationship between said output signals from the respective transceivers, comparing means responsive to said pairs of pulse signals for producing a gating signal having a duration which corresponds to the difference in phase between said pairs of pulse signals, gating means coupled to said oscillator means and responsive to said gating signal for gating through a portion of said predetermined alternating signal corresponding in a predetermined fashion to the rate of fluid flow through said conduit means, zeroing circuit means selectable at predetermined times for substituting said oscillator signal for said transceiver output signals at said phase responsive means, and producing a zeroing signal corresponding in a predetermined fashion to the phase difference between said pairs of pulse signals produced in response to said oscillator signal, said phase responsive means being further responsive at times other than said predetermined time to the zeroing signal thus established for modifying the phase difference between said pairs of pulse signals in accordance therewith, thereby modifying said gating signal by a corresponding amount so as to reference said gating signal against a signal representing zero flow, temperature sensor means mounted to said conduit for producing a temperature signal corresponding to the temperature of the fluid flowing through said conduit, and temperature compensation circuit means coupled with said comparing means and responsive to said temperature signal for modifying said gating signal in a predetermined fashion to compensate for the difference in the temperature of said fluid from a predetermined reference temperature.

21. An improvement in a monitoring circuit for an acoustic flowmeter of the type including a pair of ultrasonic transceivers at facing, longitudinally spaced locations along a conduit for producing alternating electrical output signals, each in response to the other, said electrical signals differing in phase by an amount corresponding to the rate of fluid flow in said conduit, oscillator means for feeding a predetermined alternating electrical input signal to said transceivers, said monitoring circuit being coupled to said transceivers for receiving the output signals produced thereby and for producing responsive output signals which correspond to the rate of fluid flow, the improvement comprising: a pair of phase responsive circuit means responsive respectively to the two transceivers output signals for producing pairs of pulse signals having a phase difference therebetween which corresponds in a predetermined fashion to the phase difference between said output signals from the respective transceivers, at least one of said phase responsive circuit means including phase shifting means for producing a predetermined minimum phase difference between said pulse signals in response to a zero phase difference between the transceiver output signals, comparing means responsive to said pairs of pulse signals for producing a gating signal having a duration which corresponds to the difference in phase between said pairs of pulse signals, gating means coupled to said oscillator means and responsive to said gating signal for gating through a portion of said predetermined alternating signal corresponding in a predetermined fashion to the rate of fluid flow through said conduit means, and zeroing circuit means selectable at predetermined times for substituting said oscillator signal for said transceiver output signals at both of said phase responsive circuit means and producing a zeroing reference signal corresponding to the phase difference between the pairs of pulse signals produced in response to said oscillator signals, said phase shifting means being further responsive at times other than said predetermined times to said zeroing signal thus established for modifying said predetermined minimum phase difference between said pairs of pulse signals in accordance therewith, thereby modifying said gating signal by a corresponding amount so as to reference said gating signal against a signal representing zero flow.

* * * * *